United States Patent
Dennis et al.

(10) Patent No.: US 7,258,208 B1
(45) Date of Patent: Aug. 21, 2007

(54) VERTICAL MOUNT DISC BRAKE WITH DISC SEPARATOR

(75) Inventors: Brian P. Dennis, Kalamazoo, MI (US); Peter J. Pozivilko, Saint Joseph, MI (US); Ray F. Schnell, Saint Joseph, MI (US)

(73) Assignee: Ausco Products, Inc., Benton Harbor, MI (US)

( * ) Notice: Subject to any disclaimer, the term of this patent is extended or adjusted under 35 U.S.C. 154(b) by 0 days.

(21) Appl. No.: 11/337,997

(22) Filed: Jan. 25, 2006

(51) Int. Cl.
*F16D 65/24* (2006.01)

(52) U.S. Cl. ..................... 188/170; 188/71.5
(58) Field of Classification Search .............. 188/71.5, 188/72.3, 170; 192/70.17, 70.28
See application file for complete search history.

(56) References Cited

U.S. PATENT DOCUMENTS

| | | | | |
|---|---|---|---|---|
| 2,117,433 | A * | 5/1938 | Krebs | 123/90.66 |
| 2,326,960 | A * | 8/1943 | McCune | 188/106 A |
| 2,727,594 | A * | 12/1955 | Ganster, Jr. | 188/296 |
| 3,171,522 | A * | 3/1965 | Petrie et al. | 192/70.28 |
| 3,863,038 | A * | 1/1975 | Kreitner et al. | 188/170 |
| 3,892,293 | A * | 7/1975 | Dowell | 188/71.5 |
| 4,263,991 | A * | 4/1981 | Morgan et al. | 188/170 |
| 4,279,330 | A * | 7/1981 | Pottorff et al. | 188/71.7 |
| 4,362,227 | A * | 12/1982 | Walton et al. | 192/70.28 |
| 4,396,101 | A * | 8/1983 | Black | 192/85 AA |
| 6,089,357 | A * | 7/2000 | Jackson et al. | 188/71.6 |
| 6,260,668 | B1 * | 7/2001 | McClanahan | 188/71.5 |
| 6,405,837 | B1 * | 6/2002 | Muramoto | 188/72.5 |

OTHER PUBLICATIONS

Prior art drawing, Ausco Products, Inc., Benton Harbor, Michigan, dated 1983.

* cited by examiner

*Primary Examiner*—Christopher P. Schwartz
(74) *Attorney, Agent, or Firm*—Renner, Kenner, Greive, Bobak, Taylor & Weber

(57) ABSTRACT

A brake (10) which is adapted to be rotationally coupled with an output shaft includes a housing (11). An inner shaft (33) is adapted to be attached to the output shaft for rotation therewith. A disc assembly (64) includes a plurality of stationary discs (63) carried by the housing (11) and a plurality of rotating discs (62) carried by the inner shaft (33). The rotatable discs (62) are positioned to be engaged by the stationary discs (63). A least one spring (26) biases the stationary discs (63) to engage the rotatable discs (62). A piston (53) is movable to oppose the force of the spring (26). A spacing assembly (80) is positioned on the inner shaft (33) and rotatable therewith. The spacing assembly (80) includes a plurality of o-rings (83) to separate the rotating discs (62) a predetermined axial distance from an adjacent rotating disc (62).

20 Claims, 4 Drawing Sheets

VERTICAL MOUNT DISC BRAKE WITH DISC SEPARATOR

TECHNICAL FIELD

This invention relates to a failsafe brake operable in a substantially vertical orientation. More specifically, this invention relates to such a brake wherein the discs are separated by a plurality of spacers, thus reducing friction when the brake is unactuated.

BACKGROUND ART

Many forms of heavy equipment require failsafe brake systems in order to ensure safe operation. In general, failsafe brake systems include a plurality of springs which urge a disc assembly to clamp together, thereby applying a braking torque to a shaft. A piston opposes the spring force, and when pressure is supplied to the piston, the brake is released for normal operation. In this manner, if during operation, power is lost to the equipment, the springs clamp the disc assembly together preventing rotation of the shaft until power is restored.

In one particular application, the shaft which requires a failsafe brake is positioned in a substantially vertical orientation, such as is found in drilling operations. In these applications, prior art, failsafe brakes perform poorly. Specifically, gravity causes the disc assembly to clamp together when the brake is supposed to be released. While the forces of gravity do not create enough clamping force to stop shaft movement altogether, the gravitational clamping of the disc assembly causes unwanted heat and friction and leads to premature brake failure.

In view of these problems, it is evident that the need exists for a vertical mount fail-safe brake which provides a means of separating the disc assembly while in an unactuated state.

DISCLOSURE OF THE INVENTION

It is thus an object of the present invention to provide a failsafe brake for machinery or the like, which separates a portion of the disc assembly while disengaged.

It is a further object of the present invention to provide a brake, as above, which reduces heat buildup while disengaged.

It is an additional object of the present invention to provide a brake, as above, which is efficient.

These and other objects of the present invention, as well as the advantages thereof over existing prior art forms, which will become apparent from the description to follow, are accomplished by the improvements hereinafter described and claimed.

In general, a brake is provided which includes a housing. A shaft is positioned within the housing and is rotatable about an axis. A disc assembly includes a plurality of stationary discs coupled to the housing and a plurality of rotating discs carried by the shaft. The rotatable discs are positioned to be engaged by the stationary discs. A spacing assembly is positioned on the shaft such that when the disc assembly is disengaged, the spacing assembly axially separates the rotating discs. This reduces frictional contact with the stationary discs.

In accordance with another aspect of the present invention, a brake is adapted to be rotationally coupled with an output shaft. The brake includes a housing and an inner shaft adapted to be attached to the output shaft for rotation therewith. A disc assembly includes a plurality of stationary discs carried by the housing and a plurality of rotating discs carried by the inner shaft. The rotatable discs are positioned to be engaged by the stationary discs. At least one spring biases the stationary discs to engage the rotatable discs. A piston is movable to oppose the force of the spring, and a spacing assembly is positioned on the inner shaft and rotatable therewith. The spacing assembly separates at least one of the rotating discs a predetermined axial distance from an adjacent rotating disc.

In accordance with yet another aspect of the present invention, a brake for applying a braking force to an external shaft includes a housing. An inner shaft is adapted to be coupled with the external shaft and rotatable about an axis. A disc assembly includes a plurality of stationary discs carried by the housing and a plurality of rotating discs carried by the shaft. The rotatable discs are adapted to selectively engage the stationary discs. The disc assembly is positioned in a vertically upstanding orientation defining a bottom end and a top end. A washer is coupled to the shaft and positioned proximate to the bottom end of the disc assembly. A plurality of o-rings are interposed between each of the rotating discs and between the washer and a rotating disc. The washer and the o-rings vertically separate the rotating discs thereby minimizing frictional contact between the rotating discs and the stationary discs when the rotatable discs are not engaging the stationary discs.

A preferred exemplary failsafe vertical mount brake according to the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
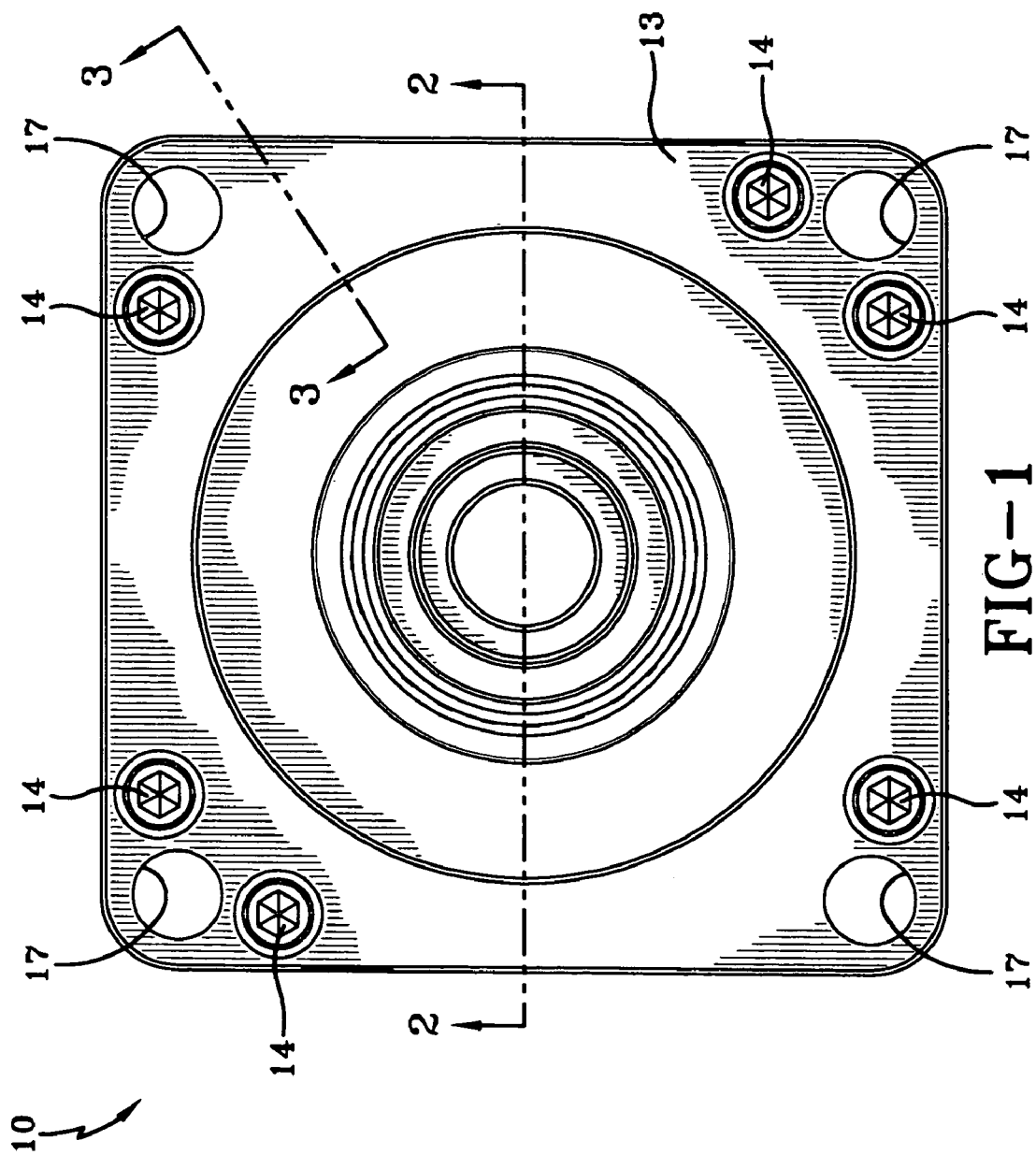
FIG. 1 is an elevational view showing a brake assembly made in accordance with the present invention.

A brake made in accordance with the present invention is indicated generally by the numeral 10 and includes a housing assembly 11 which contains and protects the working brake components in addition to providing means to mount the brake 10 to a piece of equipment. Housing assembly 11 includes a main housing 12 and a power plate 13. Main housing 12 is generally cylindrical in configuration having an open end. Power plate 13 is coupled to main housing 12 at the open end by a plurality of bolts 14. Thus configured, main housing 12 and power plate 13 define a cavity 15 which retains the working brake components as will be hereinafter discussed. A gasket 16 may be provided between a portion of the mating surface of main housing 12 and power plate 13, thereby preventing contamination of the lubricants within cavity 15. Main housing 12 and power plate 13 further include a plurality of bores 17 which are aligned and extend through housing assembly 11. Bores 17 provide a means to attach brake 10 to a machine. For example, bolts may be inserted through bores 17 and engage threaded holes in a machine frame, thereby securing housing assembly 11 thereetoo.

Main housing 12 includes a step 21 which extends radially inward from the exterior circumferential wall of main housing 12 and faces cavity 15. An annular channel 22 extends axially from step 21. Annular channel 22 is a circumferential groove having a generally square cross-section and is adapted to receive an annular spring retainer 23 which is adapted to seat at the bottom of annular channel 22. A plurality of circumferentially spaced raised circular projections 24 extend axially from spring retainer 23. Each projection 24 includes a central bore 25 therethrough and is adapted to receive a biasing element, such as a compression spring 26. Spring 26 defines a bore 27 which is sized to fit around projection 24. In this manner, annular channel 22 receives a plurality of springs 26 held in place by the projections 24. It should be appreciated that other means of locating the springs 26 may be used, such as the inclusion of individual bores drilled in the housing, each adapted to receive a spring.

Figure 3:
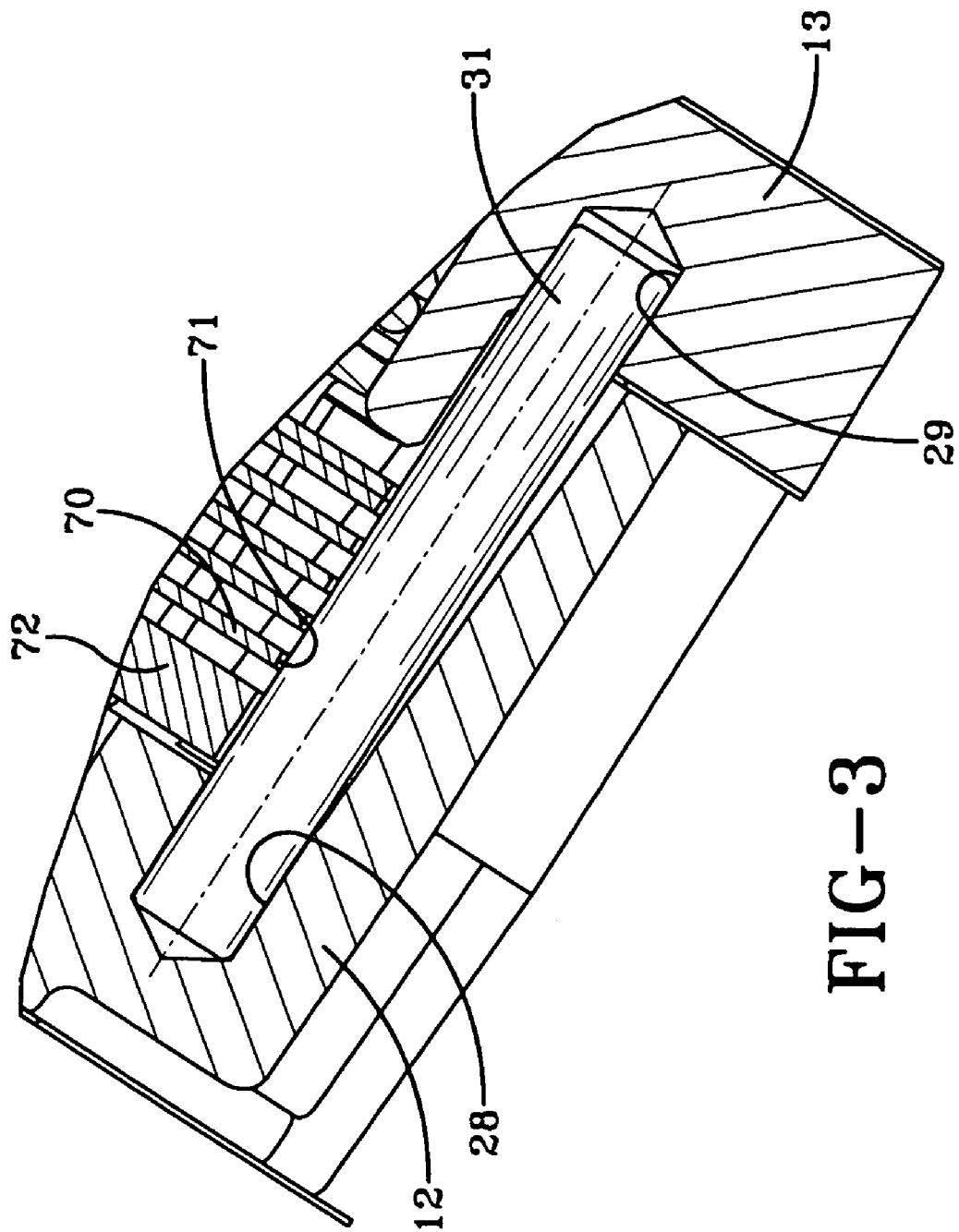
FIG. 3 is a partial sectional view to the brake of FIG. 1, taken substantially along line 3-3.

As shown in FIG. 3, main housing 12 is provided with at least two axially extending pin holes 28 which are diametrically opposed and equidistant from axis 30 of brake 10. Pin holes 28 are each adapted to receive a pin 31 and are axially aligned with a pair of matching pin holes 29 on power plate 13. When assembled, pins 31 are securely positioned within pins holes 28 and 29, thereby securing pins 31 in place.

Main housing 12 further includes a central bore 32 which is concentric with axis 30. Bore 32 allows a shaft 33 to project therethrough and includes two distinct surfaces—a bearing surface 34 which is adjacent to the end of the bore 32 proximate to cavity 15, and a retaining surface 35 which is positioned adjacent to, and which has a smaller diameter than, bearing surface 34. Bearing surface 34 is provided with a circumferential groove 36 which is adapted to receive a retaining ring 37. Retaining surface 35 is also provided with a circumferential groove 38 which is adapted to receive a lip seal 39.

Shaft 33 is generally cylindrical and includes several distinct outer surfaces. A bearing surface 40 is positioned adjacent to the end of shaft 33 proximate to main housing 12. A drive surface 41 is provided and includes a larger diameter than bearing surface 40. A raised fillet 42 is provided between drive surface 41 and bearing surface 40 creating a ledge 43 therebetween. Bearing surface 40 is provided with a circumferential groove 44 which is adapted to receive a retaining ring 45. Drive surface 41 is provided with radially projecting splines (not shown) along the axial length thereof, and also includes a circumferential channel 46 positioned near the axial end of drive surface 41 proximate to raised fillet 42.

Shaft 33 is rotatable within main housing 11. To that end, a bearing 50 is provided between shaft bearing surface 40 and bore bearing surface 34. Bearing 50 is restrained from axial movement by retaining rings 37 and 45, by retaining surface 35 and by ledge 43. Lip seal 39 creates a seal which prevents contaminates from entering cavity 15 from the main housing end of the brake 10. Shaft 33 is further provided with a stepped central bore 49 (having several steps, any one of which may include radially projecting splines along the axial length). Stepped central bore 49 is provided to couple to an external shaft (not shown) which in turn is interconnected to the drive mechanism of a machine.

Power plate 13 includes a stepped bore 56, which is adapted to allow a portion of shaft 33 project therethrough.

Bore 56 is further provided to allow an external shaft (not shown) to project therethrough and couple to shaft 33. Power plate 13 is further provided with a stop surface 51 which faces cavity 15. Extending into stop surface 51 is an annular channel 52 which is concentric with axis 30 and which has a generally square cross section adapted to receive an annular piston 53. Annular channel 52 thereby serves as a piston housing, and to that end, when annular piston 53 is so inserted, a sealed reservoir 54 is created. Piston 53 includes a pair of circumferential grooves 55 along the inner and outer radial surface. Grooves 55 each receive an o-ring 57 which sealingly contacts piston 53 and channel 52. Grooves 55 each also receive a backup ring 58 proximate to the o-ring 57 on the cavity side of grooves 55. Backup rings 58 sealingly contact piston 53 and channel 52, ensuring that pressurized fluid within reservoir 54 is not transmitted to cavity 15. A port 59 may be provided to communicate pressurized fluid from an external pressure source to the reservoir 54, thus selectively actuating the piston 53.

Piston 53 is further provided with a pair of curved fingers 60 which extend axially into cavity 15. Curved fingers 60 are separated by a pair of diametrically opposed, slots 61. While the present embodiment discloses a pair of curved fingers, it should be appreciated that more may be employed.

Figure 2:
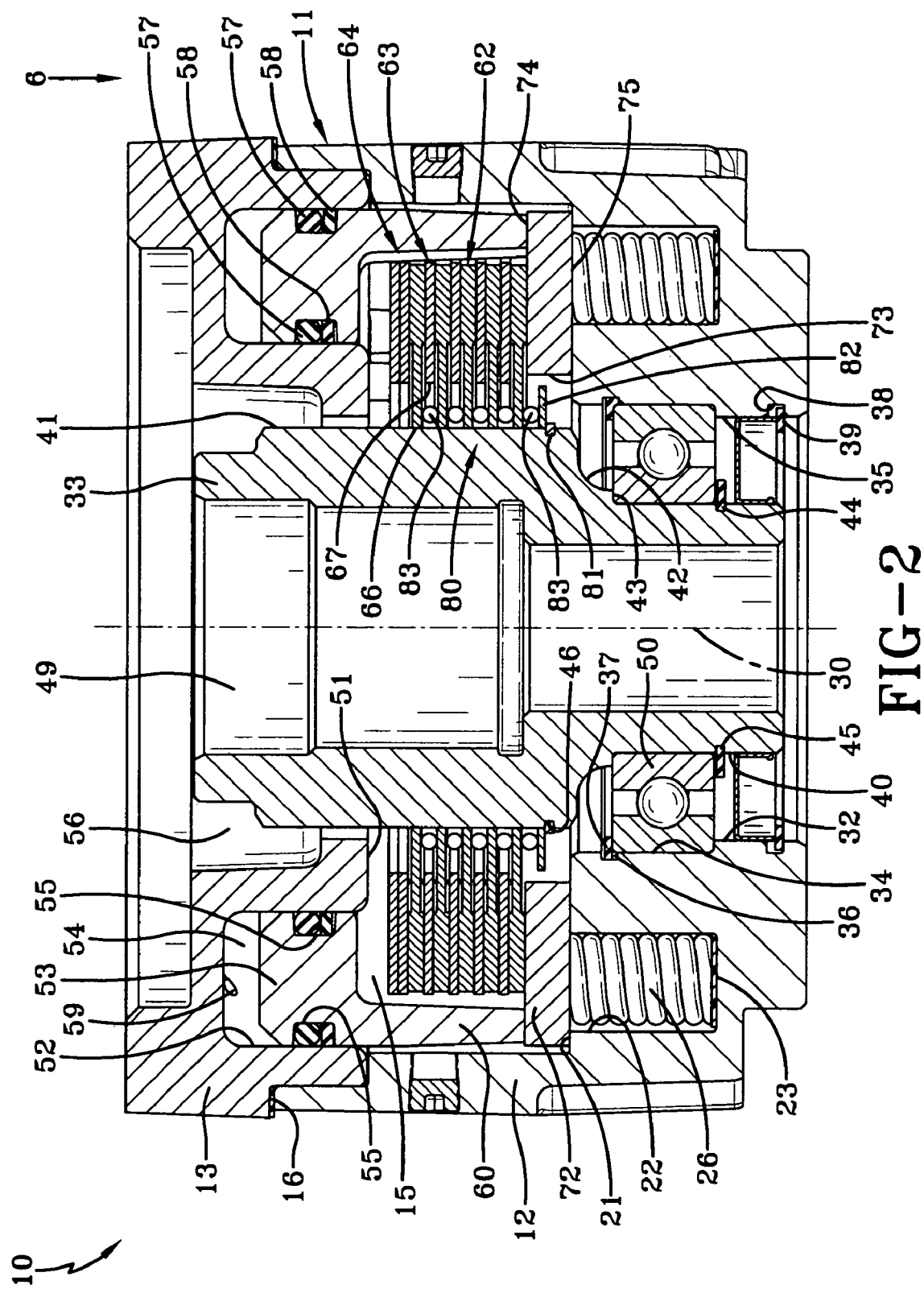
FIG. 2 is a sectional view of the brake of FIG. 1, taken substantially along line 2-2.

Brake 10 includes a plurality of rotating discs 62 and a plurality of stationary discs 63 which are part of a disc assembly generally indicated by the numeral 64. Rotating discs 62 and stationary discs 63 are stacked in an alternating manner as seen in FIG. 2. Further, additional stationary discs 62 may be provided at the end of the disc assembly proximate to power plate 13. In the present embodiment five rotating and six stationary discs are shown, but it should be appreciated that any number may be used. Rotating discs 62 are provided with a radially inner surface 66 which is splined to engage the splines of drive surface 41. In this manner, as shaft 33 rotates, rotating discs 62 rotate therewith. While rotating discs 62 are rotationally coupled to shaft 33, they are free to slide axially thereon. Stationary discs 63 have a radially inner surface 67 which fits over, but is not engage by, the splined drive surface 41 of shaft 33.

Figure 4:
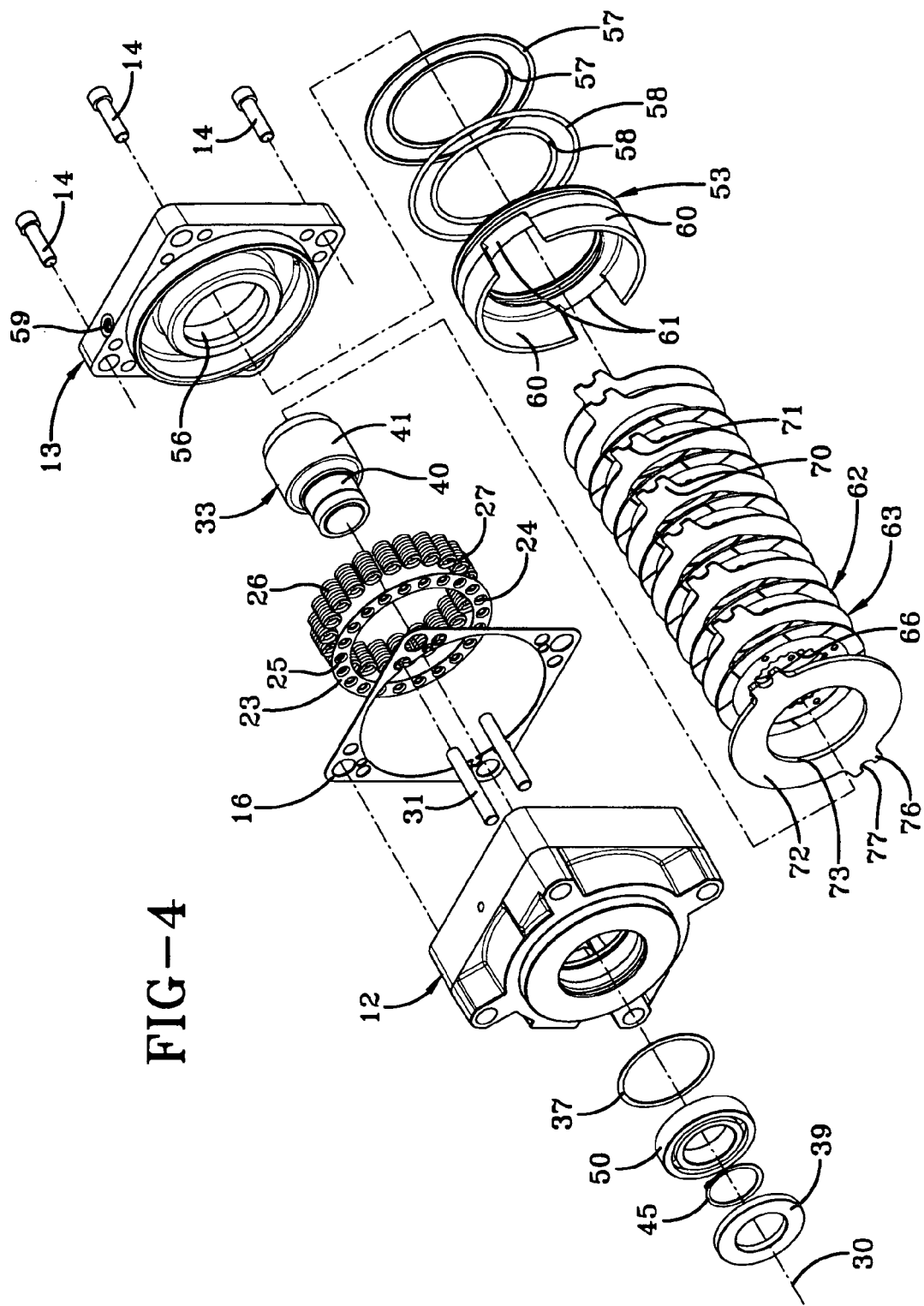
FIG. 4 is an exploded view of some of the brake components shown in FIG. 2.

As best shown in FIG. 4, stationary discs 63 are provided with diametrically opposed ears 70 extending radially outwardly therefrom. In the present embodiment, one pair of ears is provided, but it should be appreciated that any number of pairs may be provided. Ears 70 are adapted to extend radially through slots 61 of piston 53 and slidingly engage pins 31 which are positioned radially outward of fingers 60. To that end, each ear 70 is provided with a groove 71 which is adapted to slidingly receive pin 31 therein. In this manner, stationary discs 63 are coupled to the housing, and thus prevented from rotating. The stationary discs 63 are, however, free to slide axially along pins 31. Therefore, when an axial force is applied to one end of the disc assembly 64, the discs are caused to slide axially and compress against each other, creating friction. As is known in the art, when these discs are caused to engage each other, a braking torque is applied to shaft 33 due to the friction created between rotating discs 62 and stationary discs 63 which are prevented from rotating by pins 31.

Disc assembly 64 further includes a primary disc 72 positioned on the end of disc assembly 64 proximate to step 21. Primary disc 72 is annular, with an inner surface 73 which fits over but does not engage shaft 33. As is evident from FIG. 2, the outside diameter of primary disc 72 is relatively larger than that of stationary discs 63. This orientation allows fingers 60 to bypass rotating discs 62 and stationary discs 63 and contact a first surface 74 of primary disc 72, which faces cavity 15. A second surface 75 of primary disc 72 is opposed from the first surface 74 and faces main housing 12. Primary disc 72 is provided with a pair of diametrically opposed ears 76 which extend radially outward therefrom. In present embodiment, one pair of ears is provided, but it should be appreciated that any number of pairs may be provided. Ears 76 are adapted to slidingly engage pins 31. To that end, each ear is provided with a groove 77, each of which slidingly receives a pin 31 therein. In this manner, primary disc 72 is coupled to the housing, and thus prevented from rotating. The primary disc 72 is however, free to slide axially along pins 31.

As assembled, brake 10 is engaged when no hydraulic fluid is supplied to it. In other words, when no hydraulic fluid is supplied to piston reservoir 54, disc assembly 64 is compressed against stop surface 51 of power plate 13 causing a braking torque to be applied to shaft 33. In this orientation, springs 26 supply the actuating force to engage the brake by pushing primary disc 72 axially away from main housing 12. Because the disc assembly 64 is free to slide axially, springs 26 press against the second surface 75 of primary disc 72 causing it to move axially towards power plate 13. This in turn causes the rotating discs 62 and stationary discs 63 to slide axially towards power plate 13. When the disc assembly 64 contacts stop surface 51, springs 26 compress the disc assembly 64 against power plate 13. In this condition, friction between the rotating discs 62 and the stationary and primary discs 63 and 72 applies a torque to the stationary discs 63 urging them to rotate. However, because ears 70 and 76 are confined by pins 31, stationary discs 63 and primary stationary disc 72 will not rotate and a braking torque is applied to the shaft. This type of brake actuation is commonly referred to as a failsafe mechanism, because the brake is engaged when no power is applied to the system. The brake 10 will prevent unwanted and often times dangerous shaft movement when the equipment is not operating.

When the machine is turned on, fluid under pressure, such as oil, may be supplied to the annular channel 52 either automatically or by operator control. As hydraulic fluid under pressure is received in the reservoir 54, the fluid acts on piston 53 pushing it axially away from the power plate 13 towards main housing 12. Fingers 60 transfer the piston force to primary disc 72, countering the force of springs 26. If sufficient pressure is supplied within reservoir 54, the force of piston 53 will overcome the spring force, thereby moving primary disc 72 axially towards main housing 12 and against step 21. This in turn eliminates the compressive force on disc assembly 64 and the disc assembly disengages, allowing the free rotation of rotatable discs 62.

When piston 53 is actuated to disengage the disc assembly 64, it is desired that minimum frictional forces be generated. However, frictional forces may be generated despite removal of spring forces. For example, when the disc assembly is oriented in a vertically upstanding manner, a gravitational force G urges rotating and stationary discs 62 and 63 against primary disc 72 which is held against step 21 by piston 53. While the gravitational force G is less than that imparted when springs 26 compress the disc assembly 64 against stop surface 51, the force may not be insignificant. The gravitational compressive force can cause stationary discs 63 to engage rotating discs 62 which leads to unwanted braking forces, increased wear, and increased heat generation.

In order to alleviate this problem, a spacing assembly is provided and is generally indicated by the numeral 80. Spacing assembly 80 includes a retaining ring 81 and a washer 82 which are circumferentially positioned on shaft 33. Washer 82 is received on the splined drive surface 41 and thus is provided with splines on its inner diameter. In this manner, washer 82 is rotationally coupled to shaft 33 but is free to slide axially along drive surface 41. Retaining ring 81 is positioned proximate to washer 82 and securely received in channel 46. When brake 10 is oriented in the vertically upstanding manner shown in FIG. 2, retaining ring 81 axially supports washer 82 and prevents the downward axial movement thereof. An o-ring 83 is positioned circumferentially around shaft 33 and disposed between washer 82 and the rotating disc 62 proximate to the primary disc 72. Further, o-rings 83 may be positioned circumferentially around shaft 33 between each rotating disc 62. Washer 82 and o-rings 83 cooperate to reduce friction when brake 10 is disengaged, as now will be described.

When brake 10 is disengaged (when piston 53 forces primary disc 72 against step 21), the bottom rotating disc 62 proximate to primary disc 72 rests at least partially on o-ring 83 positioned proximate to washer 82. By resting on o-ring 83, which is spinning with shaft 33, contact between rotating disc 62 and primary disc 72 is reduced or may be eliminated. In other words, the weight of rotating disc 62 is restrained by o-ring 83, reducing friction causing axial forces between rotating disc 62 and primary disc 72.

Likewise, by positioning an o-ring 83 between each rotating disc 62, the contact between each adjacent stationary disc 63 is likewise reduced. Generally, only the weight of the stationary disc 63 directly above each rotating disc 62 will act on each rotating disc 62. If o-rings 83 were not provided, the compressive weight of all rotating and stationary discs positioned above a particular disc could act cumulatively on the contact surface of any given rotating and stationary disc 62 and 63. Therefore, the inclusion of o-rings 83 and washer 82 greatly reduces the effect gravity has in compressing the disc assembly, thereby reducing overall friction when brake 10 is disengaged. Further, it should be appreciated that o-rings 83 are made of a resilient compressible material such that when springs 26 cause the disc assembly to become engaged, as discussed above, the o-rings will compress allowing normal fail-safe braking.

In view of the foregoing, it should thus be evident that a brake as described herein accomplishes the objects of the present invention and otherwise substantially improves the art.

What is claimed is:

1. A brake adapted to be rotationally coupled with an output shaft, the brake comprising a housing, an inner shaft adapted to be attached to the output shaft for rotation therewith, a disc assembly including a plurality of stationary discs carried by said housing and a plurality of rotating discs carried by said inner shaft, said rotatable discs being positioned to be engaged by said stationary discs, a spacing assembly positioned on said inner shaft and rotatable therewith, said spacing assembly separating at least one of said rotating discs a predetermined axial distance from an adjacent rotating disc, wherein said spacing assembly includes a washer and at least one o-ring, said washer being secured around said shaft and positioned at an end of said disc assembly, said o-ring being positioned around said shaft and between said washer and said rotating disc that is adjacent to said washer.

2. A brake according to claim 1 wherein said disc assembly further includes a primary disc positioned at the end of said disc assembly proximate to said springs, said primary disc being prohibited from rotating.

3. A brake according to claim 2 wherein said housing includes an internal step and when said piston is actuated said primary disc is moved against said step.

4. A brake according to claim 3 wherein when said piston is actuated, said o-ring contacts said rotating disc proximate to said washer, thereby reducing frictional contact between said rotating disc and said primary disc.

5. A brake according to claim 2 wherein said piston is annular shaped and includes a plurality of axially projecting fingers, said fingers being adapted to apply force directly to said primary disc.

6. A brake according to claim 1, wherein said disc assembly is positioned in a vertically upstanding orientation defining a top end and a bottom end, said washer being positioned proximate to said bottom end.

7. A brake according to claim 6, wherein said shaft includes a circumferential channel and said spacing assembly further includes a retaining ring, said retaining ring being received in said channel and preventing downward axial movement of said washer.

8. A brake according to claim 1 further comprising at least one spring biasing said stationary discs to engage said rotatable discs, a piston movable to oppose the force of said spring.

9. A brake according to claim 1 wherein said spacing assembly includes a plurality of o-rings which are positioned around said shaft and between each said rotating disc.

10. A brake according to claim 1 wherein said o-ring is composed of a resilient material.

11. A brake according to claim 1 further comprising a plurality of pins, said housing being provided a plurality of holes, said pins being received in said holes, said stationary discs being slidably mounted on said pins, thereby rotationally confining said stationary discs.

12. A brake according to claim 1 wherein when said piston is actuated and applies a force greater than the force of said spring, said stationary discs and said rotating discs disengage.

13. A brake comprising a housing, a shaft positioned within said housing and rotatable about an axis, a disc assembly including a plurality of stationary discs coupled to said housing and a plurality of rotating discs carried by said shaft, said rotatable discs being positioned to be engaged by said stationary discs, and a spacing assembly including at least one o-ring composed of a resilient material and positioned for rotation on said shaft and interposed between two said rotating discs such that when said disc assembly is disengaged, said at least one o-ring axially separates said rotating discs, thereby reducing frictional contact with said stationary discs.

14. A brake according to claim 13, wherein said spacing assembly further includes a washer and a second o-ring, said washer being positioned on said shaft for rotation therewith, and said second o-ring being positioned between said washer and one of said rotating discs.

15. A brake according to claim 14, wherein said disc assembly is positioned in a vertically upstanding orientation defining a top end and a bottom end, said washer being positioned proximate to said bottom end.

16. A brake according to claim 14, wherein said shaft includes a circumferential channel and said spacing assembly further includes a retaining ring, said retaining ring being received in said channel and preventing downward axial movement of said washer.

17. A brake according to claim 13 wherein said rotating discs are adapted to slide axially along said shaft and said stationary discs are adapted to slide axially along said housing.

18. A brake according to claim 17 wherein said housing is provided with a plurality of axially extending pins, said stationary discs slidably engaging said pins.

19. A brake according to claim 13 further comprising at least one spring biasing said stationary discs to engage said rotating discs, and a piston movable to oppose the force of said spring.

20. A brake for applying a braking force to an external shaft comprising a housing, an inner shaft adapted to be coupled with the external shaft and rotatable about an axis, a disc assembly including a plurality of stationary discs carried by said housing and a plurality of rotating discs carried by said shaft, said rotatable discs being adapted to selectively engage said stationary discs, said disc assembly being positioned in a vertically upstanding orientation defining a bottom end and a top end, a washer coupled to said shaft and positioned proximate to said bottom end of said disc assembly, a plurality of o-rings interposed between each said rotating disc and between said washer and a said rotating disc, wherein said washer and said o-rings vertically separate said rotating discs thereby minimizing frictional contact between said rotating discs and said stationary discs when said rotatable discs are not engaging said stationary discs.

* * * * *